(12) United States Patent
Lee et al.

(10) Patent No.: US 8,215,428 B2
(45) Date of Patent: Jul. 10, 2012

(54) POWER CONFIGURATION SYSTEM FOR FUEL CELL HYBRID VEHICLE AND METHOD FOR CONTROLLING THE SAME

(75) Inventors: Nam Woo Lee, Gyeonggi-do (KR); Sang Uk Kwon, Gyeonggi-do (KR); Seong Pil Ryu, Gyeonggi-do (KR); Jae Won Jung, Gyeonggi-do (KR); Sun Soon Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 355 days.

(21) Appl. No.: 12/508,124

(22) Filed: Jul. 23, 2009

(65) Prior Publication Data
US 2010/0089672 A1     Apr. 15, 2010

(30) Foreign Application Priority Data
Oct. 10, 2008 (KR) .................. 10-2008-0099844

(51) Int. Cl.
*B60W 20/00* (2006.01)
(52) U.S. Cl. .................. 180/65.275; 701/22
(58) Field of Classification Search ............... 180/65.21, 180/65.275, 65.265; 701/22; 429/9, 13, 429/432, 431, 429, 483
See application file for complete search history.

(56) References Cited

U.S. PATENT DOCUMENTS

| 7,427,450 | B2 * | 9/2008 | Raiser ........................... 429/431 |
| 7,682,719 | B2 * | 3/2010 | Lienkamp et al. ............. 429/483 |
| 7,843,713 | B2 * | 11/2010 | Takenaka et al. ............... 363/95 |
| 7,862,943 | B2 * | 1/2011 | Hortop et al. ................. 429/429 |
| 7,879,502 | B2 * | 2/2011 | Lienkamp et al. ............. 429/432 |
| 7,893,561 | B2 * | 2/2011 | Weidenheimer et al. ....... 307/71 |
| 7,996,124 | B2 * | 8/2011 | Kwon et al. .................... 701/22 |
| 2004/0202900 | A1 * | 10/2004 | Pavio et al. ...................... 429/9 |
| 2008/0171239 | A1 * | 7/2008 | Tucker et al. ................... 429/13 |
| 2009/0112384 | A1 * | 4/2009 | Jeon et al. ....................... 701/22 |
| 2009/0166114 | A1 * | 7/2009 | Taguchi et al. .......... 180/65.265 |

FOREIGN PATENT DOCUMENTS

| JP | 2000-134720 A | 5/2000 |
| JP | 2003-249236 A | 9/2003 |
| JP | 2004-056989 A | 2/2004 |
| JP | 2004-248432 A | 9/2004 |
| JP | 2005-353511 A | 12/2005 |
| JP | 2006-109608 A | 4/2006 |
| JP | 2008-077920 A | 4/2008 |
| KR | 10-0951975 | 12/2009 |

* cited by examiner

*Primary Examiner* — Hau Phan
(74) *Attorney, Agent, or Firm* — Edwards Wildman Palmer LLP; Peter F. Corless

(57) ABSTRACT

The present invention provides a power configuration system for a fuel cell hybrid vehicle and a method for controlling the same, in which a second blocking diode is installed in a main bus terminal at an output terminal of a fuel cell (in front of a first blocking diode) separately from the existing first blocking diode installed in the main bus terminal, the positions of high voltage components for driving the fuel cell are changed from the rear of the first blocking diode to the front of the first blocking diode, and the operations of the high voltage components are appropriately controlled during regenerative braking such that the voltage of the fuel cell may be maintained below that of the supercapacitor.

20 Claims, 14 Drawing Sheets

POWER CONFIGURATION SYSTEM FOR FUEL CELL HYBRID VEHICLE AND METHOD FOR CONTROLLING THE SAME

CROSS-REFERENCE TO RELATED APPLICATION

This application claims under 35 U.S.C. §119(a) the benefit of Korean Patent Application No. 10-2008-0099844 filed Oct. 10, 2008, the entire contents of which are incorporated herein by reference.

BACKGROUND (a) Technical Field

The present disclosure relates to a power configuration system for a fuel cell hybrid vehicle and a method for controlling the same. More particularly, the present invention relates to a power configuration system for a fuel cell hybrid vehicle and a method for controlling the same, which maintains the voltage of a fuel cell below that of a storage means during regenerative braking so that the fuel cell may not unnecessarily charge the storage means, thereby preferably increasing the amount of regenerative braking energy and suitably improving fuel efficiency.

(b) Background Art

A fuel cell is an electricity generation system that does not convert chemical energy of fuel into heat by combustion, but electrochemically converts the chemical energy directly into electrical energy in a fuel cell stack. Preferably, the fuel cell can be applied to the electric power supply to small-sized electrical and electronic devices, particularly portable devices, as well as industrial and household appliances and vehicles.

Among the most attractive fuel cells for a vehicle is a proton exchange membrane fuel cell or a polymer electrolyte membrane fuel cell (PEMFC). A PEMFC includes a fuel cell stack comprising a membrane electrode assembly (MEA), a gas diffusion layer (GDL), a gasket, a sealing member, and a bipolar plate. The MEA includes a polymer electrolyte membrane through which hydrogen ions are transported. An electrode/catalyst layer, in which an electrochemical reaction takes place, is suitably disposed on each of both sides of the polymer electrolyte membrane. The GDL suitably functions to uniformly diffuse reactant gases and transmit generated electricity. The gasket suitably functions to provide an appropriate airtightness to reactant gases and coolant. The sealing member suitably functions to provide an appropriate bonding pressure. The bipolar plate suitably functions to support the MEA and GDL, collect and transmit generated electricity, transmit reactant gases, transmit and remove reaction products, and transmit coolant to remove reaction heat, etc.

Preferably, the fuel cell stack is composed of a plurality of unit cells, each of the unit cells including an anode, a cathode, and an electrolyte (electrolyte membrane). Hydrogen as fuel is suitably supplied to the anode ("fuel electrode", "hydrogen electrode", or "oxidation electrode") and oxygen as oxidant is suitably supplied to the cathode ("air electrode", "oxygen electrode" or "reduction electrode").

The hydrogen supplied to the anode is dissociated into hydrogen ions (protons, $H^+$) and electrons ($e^-$) by a catalyst that is preferably disposed in the electrode/catalyst layer. The hydrogen ions are suitably transmitted to the cathode through the electrolyte membrane, which is a cation exchange membrane, and the electrons are suitably transmitted to the cathode through the GDL and the bipolar plate.

At the cathode, the hydrogen ions supplied through the (polymer) electrolyte membrane and the electrons transmitted through the bipolar plate react with the oxygen in the air supplied to the cathode to produce water. Migration of the hydrogen ions causes electrons to flow through an external conducting wire, which generates electricity and heat.

Preferably, fuel cell hybrid vehicles including large vehicles, such as buses, as well as small vehicles, have a system equipped with an electricity storage means such as a high voltage battery or a supercapacitor as an auxiliary power source for suitably providing the power required to drive a motor in addition to the fuel cell as a main power source.

The present invention features a fuel cell-supercapacitor hybrid vehicle that does not employ a power converter. The fuel cell-supercapacitor hybrid vehicle has certain preferred advantages, for example, but not limited to, high fuel efficiency (high regenerative braking, high efficiency of supercapacitor, and without the use of the power converter), an increase in durability of the fuel cell, high reliability control (automatic power assist and automatic regenerative braking function).

For example, in the hybrid vehicle in which the fuel cell and the supercapacitor are suitably directly connected, the fuel cell continuously outputs power at a constant level during driving. Accordingly, if there is surplus power, the supercapacitor is suitably charged with the surplus power, whereas, if there is insufficient power, the supercapacitor suitably supplies the insufficient power to drive the vehicle.

A power configuration system of a fuel cell-supercapacitor hybrid vehicle as set forth by preferred embodiments of the present invention is described below.

FIG. 1 is a schematic diagram showing an exemplary power configuration system of a conventional fuel cell-supercapacitor hybrid vehicle. Preferably, the power configuration system of the fuel cell-supercapacitor hybrid vehicle includes a fuel cell 10 suitably used as a main power source, a supercapacitor 20 suitably used as an auxiliary power source, and a motor control unit (MCU) 40, which preferably includes an inverter and is a power module that operates a drive motor 41. The MCU 40 is suitably connected to output terminals of the fuel cell 10 and the supercapacitor 20 to produce 3-phase pulse width modulation (PWM) by receiving direct current from the fuel cell 10 and the supercapacitor 20 and to control the operation of the drive motor 41 and regenerative braking.

Preferably, in the above power configuration system, the fuel cell 10, which receives hydrogen from a hydrogen tank and air from an air blower and generates electricity by an electrochemical reaction between hydrogen and oxygen in the air, is suitably used as the main power source. In certain embodiments, the drive motor 41 and the MCU 40 are directly connected to the fuel cell 10 through a main bus terminal 30, and the supercapacitor 20 is connected to the main bus terminal 30 to provide power assist and regenerative braking.

Preferably, a low voltage DCDC converter (LDC) 50 for voltage conversion and an auxiliary battery (e.g., 12V auxiliary battery) 51 for driving auxiliary components are connected to the main bus terminal 30. Moreover, balance of plant (BOP) components for driving the fuel cell 10, such as an air blower 11, a water pump 12, a radiator fan 13, and a hydrogen recirculation blower 14, are suitably connected to the main bus terminal 30 through a high voltage junction box 15 to facilitate the starting of the fuel cell 10.

Furthermore, a reverse blocking diode 31 for preventing reverse flow of current is installed in the main bus terminal 30, and a load device for preventing voltage generation while the operation of the fuel cell 10 is stopped is connected to the fuel cell 10. As the load device, a heater resistor (COD) 16 may be connected to the output terminal of the fuel cell 10 through a high voltage junction box 17. The heater resistor 16 consumes the power of the fuel cell 10 during initial start-up to rapidly heat coolant of the fuel cell stack (temporarily used during initial start-up).

In the above-described power configuration system of FIG. 1, the fuel cell 10 and the supercapacitor 20 are suitably connected in parallel. During initial start-up, the power of the auxiliary battery 51 is boosted to a high voltage by the LDC 50 and then supplied to the high voltage components 11 to 14 through the high voltage junction box 15, thus driving the fuel cell 10. When the start-up of the fuel cell 10 is completed, the LDC 50 enters a 12 V charging mode, and the supercapacitor 20 starts charging and, when the charging is completed, suitably drives the vehicle with discharge power.

Driving modes of the hybrid vehicle, preferably equipped with the fuel cell as the main power source and the supercapacitor as the auxiliary power source, includes an electric vehicle (EV) mode in which the motor is suitably driven only by the power of the fuel cell, a hybrid electric vehicle (HEV) mode in which the motor is suitably driven by the power of the fuel cell and the power of the supercapacitor at the same time, and a regenerative braking (RB) mode in which the supercapacitor is suitably charged.

However, the fuel cell-supercapacitor hybrid vehicle has a consideration in that the supercapacitor is automatically charged by the fuel cell, which restricts the regenerative braking. During braking of the vehicle, a considerable amount of regenerative braking energy generated in the drive motor is stored in the supercapacitor. In this case, since the load of the fuel cell is removed, the voltage of the fuel cell is suitably increased to charge the supercapacitor.

When the amount of electrical energy stored in the supercapacitor is smaller, it is possible to store a larger amount of regenerative braking energy provided by the drive motor in the supercapacitor. Accordingly, in order to store a greater amount of regenerative braking energy in the supercapacitor, it is necessary to reduce the amount of electrical energy charged by the fuel cell in the supercapacitor at least during the regenerative braking, and it is thus possible to prevent deterioration of fuel efficiency.

As such, during the regenerative braking, the fuel cell should not charge the supercapacitor with the electrical energy thereof and, accordingly, the voltage of the fuel cell should be lower than that of the supercapacitor. However, as the supercapacitor is suitably charged during braking of the vehicle, the voltage of the fuel cell is gradually increased to reach an open circuit voltage (OCV) value. And, accordingly, the number of times each of the unit cells of the fuel cell reaches a predetermined voltage (e.g., 0.85 V) is increased, and thus the durability of the fuel cell is considerably reduced. In order to improve the durability of the fuel cell, the voltage per cell of the fuel cell should preferably be maintained below a predetermined level (e.g., 0.85 V).

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides a power configuration system for a fuel cell hybrid vehicle and a method for controlling the same, which maintain the voltage of a fuel cell suitably below that of a storage means (e.g., supercapacitor) during regenerative braking so that the fuel cell may not unnecessarily charge the storage means, thereby increasing the amount of regenerative braking energy and suitably improving fuel efficiency.

In another aspect, the present invention provides a power configuration system for a fuel cell hybrid vehicle and a method for controlling the same, which suitably maintain the voltage per cell of a fuel cell below a predetermined level by preventing the voltage of the fuel cell from rising during regenerative braking, thus suitably improving the durability of the fuel cell.

In another aspect, the present invention preferably provides a power configuration system of a fuel cell hybrid vehicle equipped with a fuel cell as a main power source and a storage means as an auxiliary power source, the system being characterized in that high voltage components for driving the fuel cell are suitably arranged in front of a first blocking diode installed in a main bus terminal such that the voltage of the fuel cell is preferably maintained below that of the storage means by consuming electric power of the fuel cell when the high voltage components are driven during regenerative braking.

In a preferred embodiment, a second blocking diode may be added to the main bus terminal at an output terminal of the fuel cell such that the high voltage components may be suitably arranged between the second blocking diode and the first blocking diode.

In another preferred embodiment, the high voltage components may include an LDC to which an auxiliary battery is connected, a radiator fan, and a hydrogen recirculation blower.

In still another preferred embodiment, the high voltage components may further include an air supply device for suitably supplying air to the fuel cell.

In yet another preferred embodiment, the high voltage components may further include a water pump for suitably circulating coolant of the fuel cell.

In another aspect, the present invention provides a method for controlling a power configuration system of a fuel cell hybrid vehicle equipped with a fuel cell as a main power source and a storage means as an auxiliary power source, the method including: allowing the fuel cell hybrid vehicle, in which high voltage components including an LDC for driving the fuel cell are suitably arranged between a first blocking diode and a second blocking diode installed in a main bus terminal, to enter a regenerative braking mode; and allowing a fuel cell system controller to drive the high voltage components to consume electric power of the fuel cell when entering the regenerative braking mode such that the voltage of the fuel cell is suitably maintained below that of the storage means.

In a preferred embodiment, the method for controlling the power configuration system of the fuel cell hybrid vehicle may further include: allowing the fuel cell hybrid vehicle to enter an idle stop mode; allowing the fuel cell system controller to stop the operation of an air supply device and allowing the LDC to boost the voltage supplied from an auxiliary battery and to supply the boosted voltage to the main bus terminal, the boosted voltage of the main bus terminal being suitably maintained below that of the storage means; and allowing the fuel cell system controller to drive the high voltage components including the air supply device for driving the fuel cell by the boosted voltage and the voltage of the storage means so as to restart power generation of the fuel cell.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
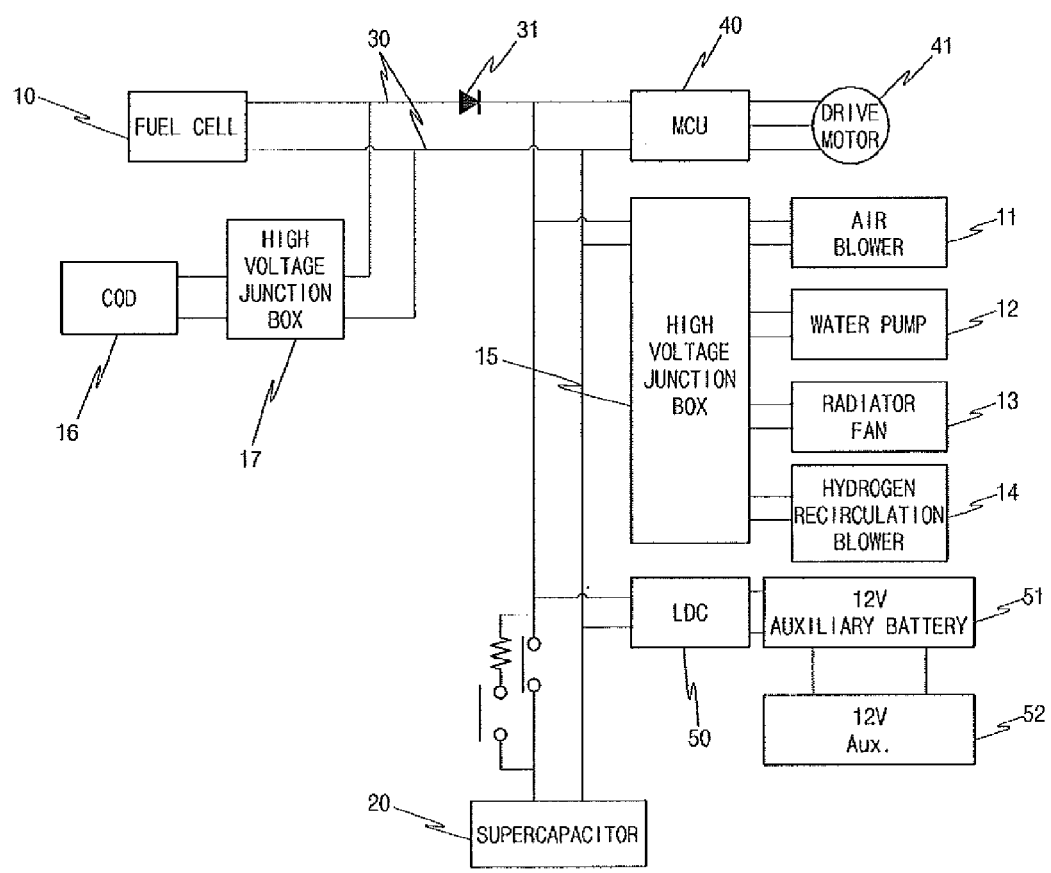
FIG. 1 is a schematic diagram showing a power configuration system of a conventional fuel cell-supercapacitor hybrid vehicle.

Reference numerals set forth in the Drawings includes reference to the following elements as further discussed below:

| 110: fuel cell | 111: air blower |
| 112: water pump | 114: heater resistor |
| 115: radiator fan | 116: hydrogen recirculation blower |
| 120: supercapacitor | 131: first blocking diode |
| 132: second blocking diode | 140: MCU |
| 141: drive motor | 150: LDC |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention includes a power configuration system of a fuel cell hybrid vehicle equipped with a fuel cell as a main power source and a storage means as an auxiliary power source, wherein one or more high voltage components for driving the fuel cell are arranged in front of a first blocking diode installed in a main bus terminal.

In one embodiment of the present invention, the voltage of the fuel cell is maintained below that of the storage means by consuming electric power of the fuel cell when the one or more high voltage components are driven during regenerative braking.

In another embodiment, a second blocking diode is added to the main bus terminal at an output terminal of the fuel cell.

In still another further embodiment, high voltage components for driving the fuel cell are arranged between the second blocking diode and the first blocking diode.

In a related embodiment, the high voltage components are selected from the group consisting of: an LDC to which an auxiliary battery is connected, a radiator fan, a hydrogen recirculation blower, an air supply device for supplying air to the fuel cell, and a water pump for circulating coolant of the fuel cell.

In another aspect, the invention features a method for controlling a power configuration system of a fuel cell hybrid vehicle equipped with a fuel cell as a main power source and a storage means as an auxiliary power source, the method comprising allowing the fuel cell hybrid vehicle, wherein one or more high voltage components for driving the fuel cell are arranged between a first blocking diode and a second blocking diode installed in a main bus terminal, to enter a regenerative braking mode; and allowing a fuel cell system controller to drive the high voltage components to consume electric power of the fuel cell when entering the regenerative braking mode.

In one embodiment, the high voltage components are selected from the group consisting of: an LDC to which an auxiliary battery is connected, a radiator fan, and a hydrogen recirculation blower.

In another embodiment, the voltage of the fuel cell is maintained below that of the storage means.

In a further related embodiment, the method further comprises allowing the fuel cell hybrid vehicle to enter an idle stop mode.

In still another embodiment, the method further comprises allowing the fuel cell system controller to stop the operation of an air supply device and allowing an LDC to boost the voltage supplied from an auxiliary battery and to supply the boosted voltage to the main bus terminal, the boosted voltage of the main bus terminal being maintained below that of the storage means.

In another embodiment, the method further comprises allowing the fuel cell system controller to drive the high voltage components including the air supply device for driving the fuel cell by the boosted voltage and the voltage of the storage means so as to restart power generation of the fuel cell.

The present invention also includes a motor vehicle comprising a power configuration system of a fuel cell hybrid vehicle equipped with a fuel cell as a main power source and a storage means as an auxiliary power source as described in any of the above mentioned aspects.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In the following description, an exemplary fuel cell-supercapacitor hybrid vehicle will be illustrated by way of examples; however, it will be readily appreciated by those skilled in the art that the supercapacitor may be substituted with a high voltage battery as another auxiliary power source (e.g. fuel cell-battery hybrid vehicle). Moreover, it is well-known in the art that the supercapacitor and the battery are rechargeable electric storage devices used as auxiliary power sources of a fuel cell hybrid vehicle.

Figure 2:
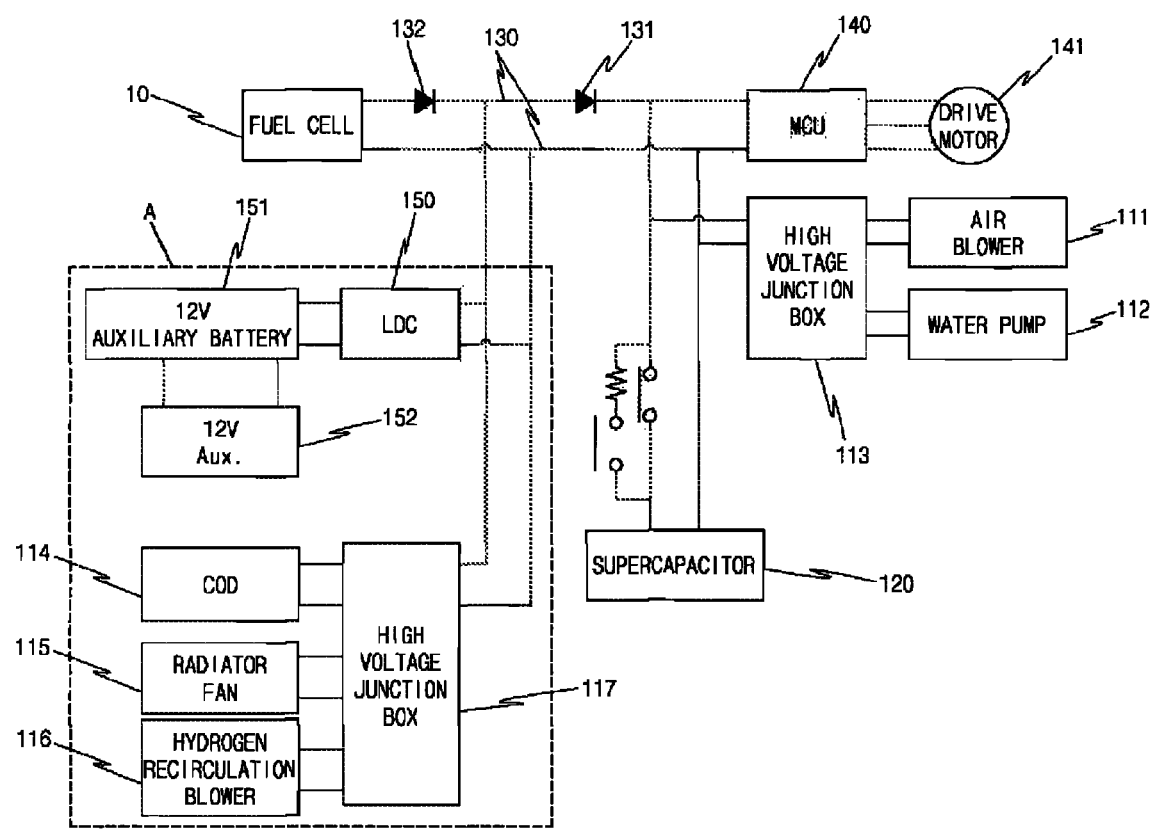
FIG. 2 is a schematic diagram showing a power configuration system of a fuel cell-supercapacitor hybrid vehicle in accordance with a preferred embodiment of the present invention.

FIG. 2 is a schematic diagram showing an exemplary power configuration system of a fuel cell-supercapacitor hybrid vehicle in accordance with preferred embodiments of the present invention. For example, in preferred embodiments, the power configuration system of the fuel cell-supercapacitor hybrid vehicle preferably includes a fuel cell 110 suitably used as a main power source, a supercapacitor 120 suitably used as an auxiliary power source, and a motor control unit (MCU) 140, which preferably includes an inverter and is a power module that operates a drive motor 141. In preferred embodiments, the MCU 140 is connected to output terminals of the fuel cell 110 and the supercapacitor 120 to suitably produce 3-phase pulse width modulation (PWM) by receiving direct current from the fuel cell 110 and the supercapacitor 120 and to control the operation of the drive motor 141 and regenerative braking.

In other preferred embodiments of the invention, the drive motor 141 and the MCU 140 are directly connected to the fuel cell 110 through a main bus terminal 130, and the supercapacitor 120 is suitably connected to the main bus terminal 130 to provide power assist and regenerative braking. Thus, the fuel cell 110 and the supercapacitor 120 are suitably connected in parallel with respect to the drive motor 141 and the MCU 140.

There are two differences between the power configuration system of the present invention and the conventional power configuration system as described herein. For example, first a single power diode 132 is added to an output terminal of the fuel cell 110. In the following description, an existing blocking diode 131 installed in the main bus terminal 130 to prevent reverse current from flowing to the fuel cell 110 is referred to as a first blocking diode, and the power diode 132 additionally installed in the main bus terminal 130 toward the output terminal of the fuel cell 110 is referred to as a second blocking diode.

Moreover, the positions of high voltage components 114 to 117 and 150 for driving the fuel cell 110 are changed from the conventional positions at the rear of the first blocking diode 131 of the main bus terminal (see FIG. 1) to the positions in front of the first blocking diode 131 of the main bus terminal (see FIG. 2).

In the above arrangement, the high voltage components 114 to 117 and 150 are connected to the main bus terminal 130 between the second blocking diode 132 and the first blocking diode 131. The high voltage components for driving the fuel cell 110 preferably include a radiator fan 115, a hydrogen recirculation blower 116, and an LDC 150.

Preferably, the high voltage components such as the radiator fan 115 and the hydrogen recirculation blower 116 are suitably connected to the main bus terminal 130 through a high voltage junction box 117, and an auxiliary battery (e.g., 12V auxiliary battery) 151 for supplying electric power to low voltage electrical components is suitably connected to the LDC 150.

In certain examples, the high voltage components, moved to the front of the first blocking diode 131, may include an air blower 111 as an air supply device for supplying air to the fuel cell 110 and a water pump 112 for circulating coolant of the fuel cell 110, in addition to the radiator fan 115 and the hydrogen recirculation blower 116. However, the air blower 111 may preferably be placed in the conventional position of the main bus terminal such that the fuel cell 110 may be immediately started during idle stop and during release of idle stop.

In the example shown in FIG. 2, the water pump 112 as well as the air blower 111 is preferably placed in the conventional position and suitably connected to the main bus terminal through a high voltage junction box 113. The other high voltage components 114 to 117 and 150 are suitably disposed between the two diodes 131 and 132 installed in the main bus terminal 130.

In certain preferred embodiments as described herein in the above-described power configuration system of the present invention, the start-up of the fuel cell 110 is suitably performed in the same manner as the conventional power configuration system through the LDC 150. Preferably, during regenerative braking, the first blocking diode 131 suitably prevents the regenerative braking energy from being supplied to the fuel cell 110, and thus it is possible to store a sufficient amount of regenerative braking energy in the supercapacitor 120.

Further, during regenerative braking, the electrical energy of the fuel cell 110 is consumed by the high power components 114 to 117 so as to suitably reduce the voltage of the fuel cell 110 below a predetermined level. Accordingly, the voltage of the fuel cell 110 may be suitably reduced below that of the supercapacitor 120 by controlling the operations of the high voltage components. Accordingly, in preferred embodiments of the present invention, it is possible to prevent the electrical energy of the fuel cell 110 from being supplied to the supercapacitor 120, and thus it is possible to prevent the amount of regenerative braking energy stored in the supercapacitor 120 from being reduced.

Accordingly, in certain embodiments, where the power generation of the fuel cell 110 is suitably stopped during idle stop, it is necessary to supply electric power to area A of FIG. 2. At this time, the LDC 150 may boost the electric power of the auxiliary battery 151 and supply the boosted power to the fuel cell 110, but the voltage boosted by the second blocking diode 132 may not be supplied to the fuel cell 110. Preferably, the boosted voltage should be maintained lower than the voltage of the supercapacitor 120.

According to further preferred embodiments, after the idle stop is terminated, the start-up of the fuel cell 110 is performed in the same manner as the conventional start-up procedure.

Preferably, since the present invention does not require any hardware other than a single diode, it is possible to suitably eliminate the cost increase factor, suitably increase the amount of regenerative braking energy, and suitably enable the implementation of the idle stop function (fuel cell power generation shutdown).

An exemplary start-up sequence of the fuel cell in the conventional power configuration system and that of the power configuration system of the present invention will be described with reference to FIGS. 3A, 3B, 4A, and 4B below. The control of the power configuration system described herein may be suitably performed by a fuel cell system controller or its subordinate controllers such as controllers for various components (e.g., an LDC controller in the case of the LDC).

Figure 3A:
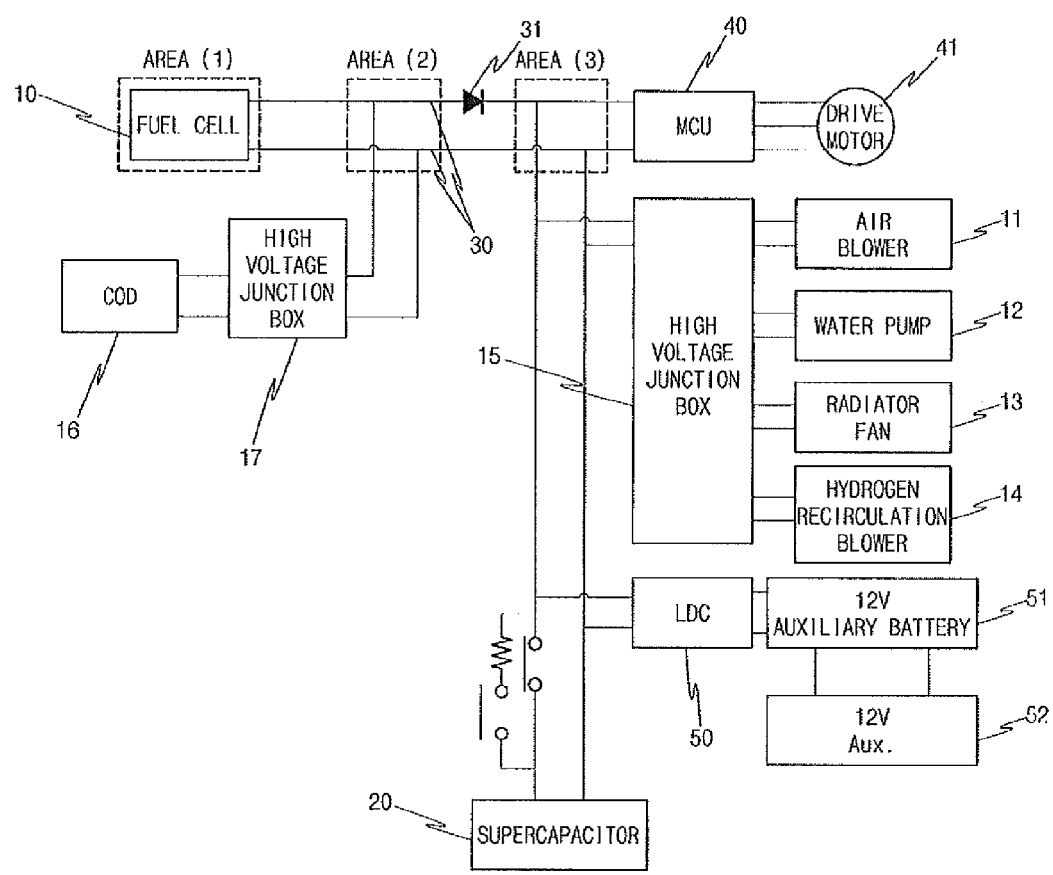
FIG. 3A is a diagram illustrating a start-up sequence of the fuel cell in the conventional power configuration system.
Figure 3B:
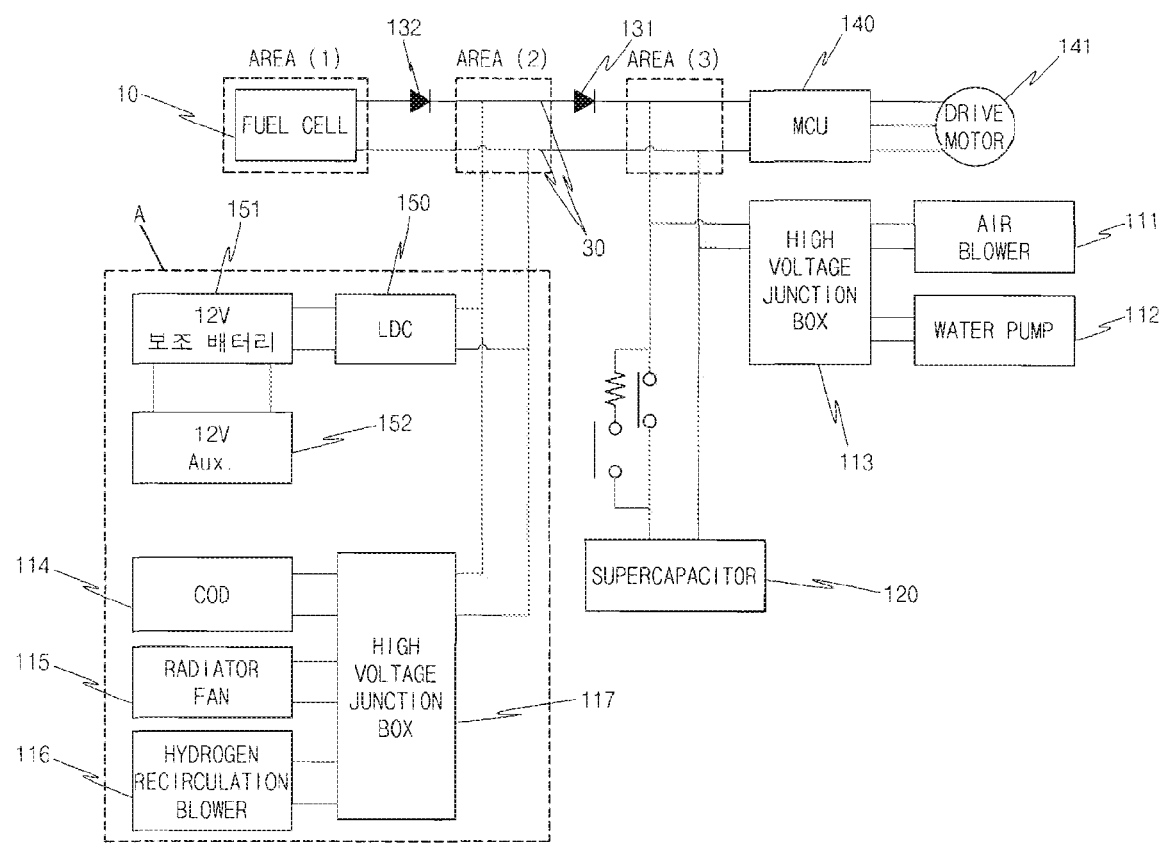
FIG. 3B is a diagram illustrating a start-up sequence of the fuel cell in the power configuration system of the present invention.
Figure 4A:
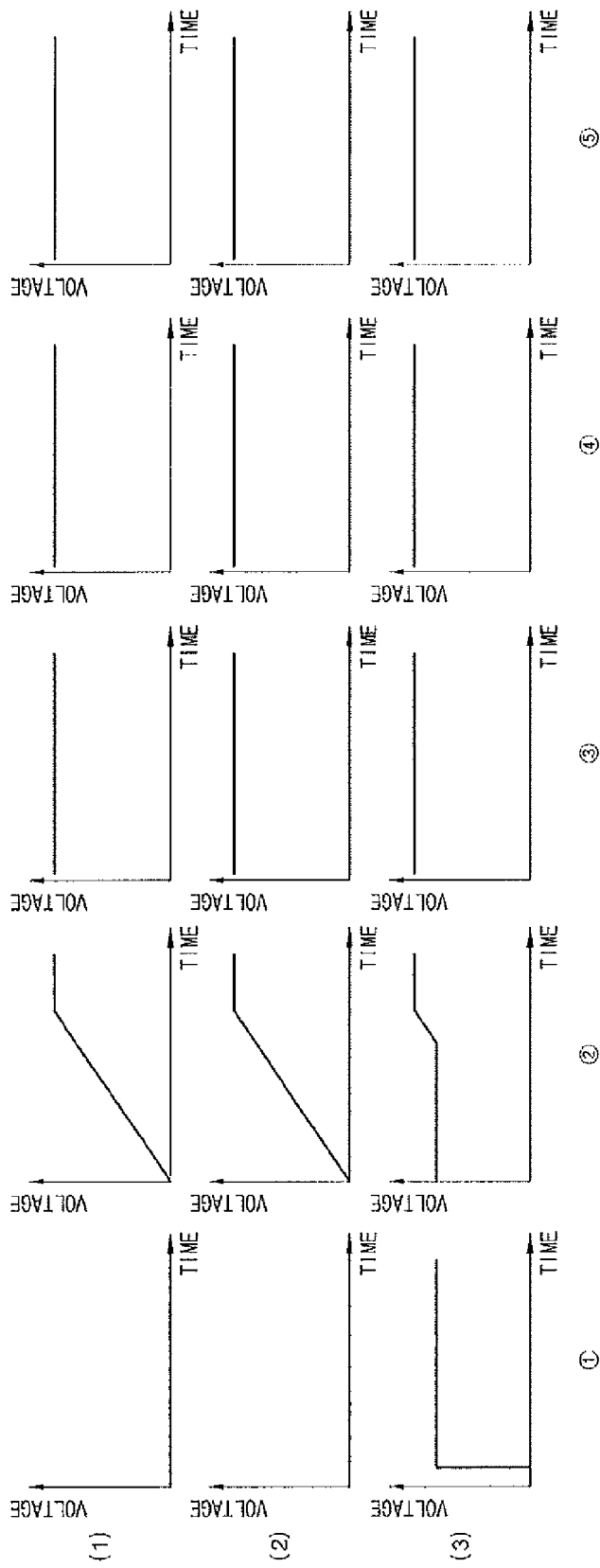
FIG. 4A is a diagram showing changes in voltage during start-up of the fuel cell in the conventional power configuration system.
Figure 4B:
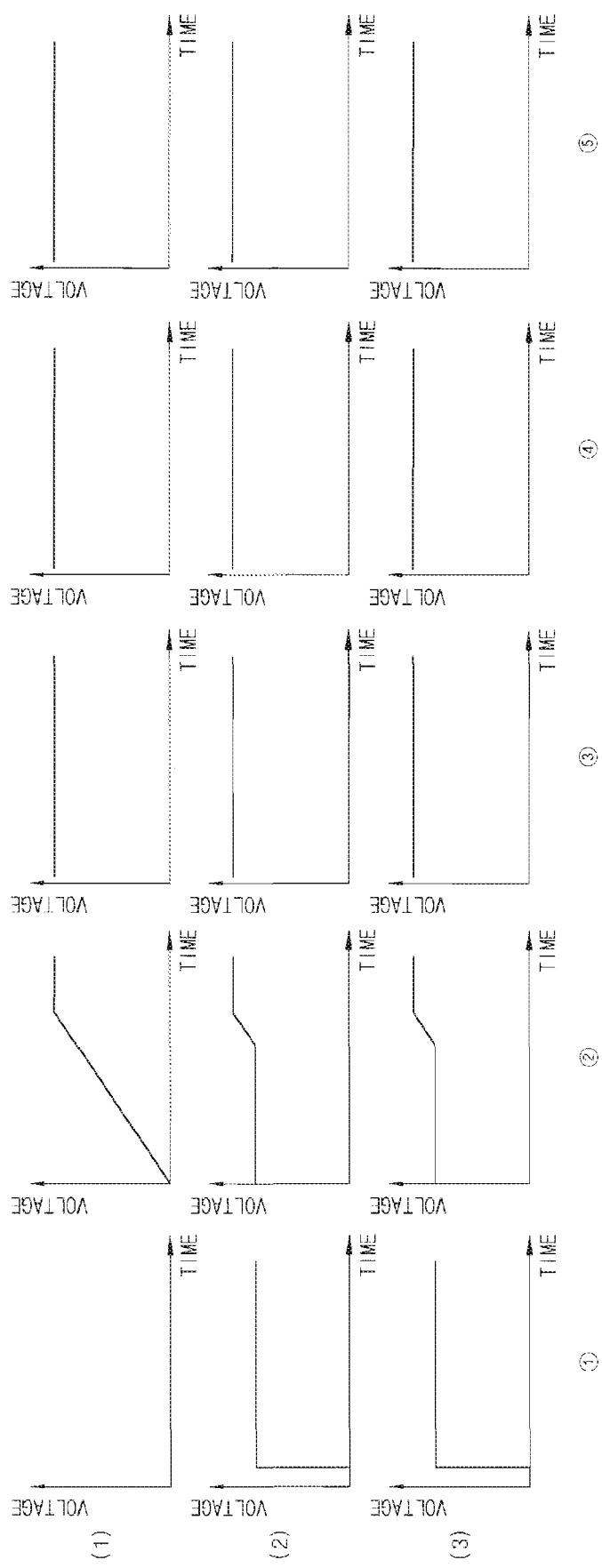
FIG. 4B is a diagram showing changes in voltage during start-up of the fuel cell in the power configuration system of the present invention.

FIG. 3A is an exemplary diagram illustrating a start-up sequence of the fuel cell in the conventional power configuration system, FIG. 3B is an exemplary diagram illustrating a start-up sequence of the fuel cell in the power configuration system of the present invention, FIG. 4A is an exemplary diagram showing changes in voltage during start-up of the fuel cell in the conventional power configuration system, and FIG. 4B is an exemplary diagram showing changes in voltage during start-up of the fuel cell in the power configuration system of the present invention.

Referring to FIGS. 3A and 4A, in certain preferred embodiments of the present invention, during the conventional start-up of the fuel cell 10, the LDC 50 boosts the low voltage power of the auxiliary battery (e.g., 12V auxiliary battery) 51 to the high voltage and supplies the boosted high voltage (e.g., 320 V) to the high voltage junction box 15. Accordingly, the electric power for starting the fuel cell 10 is supplied to the high voltage components 12 to 14 including the air blower 11 through the high voltage junction box 15, thus enabling the start-up (① of FIG. 4A).

In this state, a hydrogen valve is suitably opened to supply hydrogen to the fuel cell stack, and the control of the air supply is performing by controlling the RPM of the air blower 11 (② of FIG. 4A). Preferably, after the fuel cell 10 is started as such, the LDC 50 is suitably converted into a buck mode (12V charging) (③ of FIG. 4A), and accordingly, the supercapacitor 20 is initially charged with the electrical energy of the fuel cell 10 (④ of FIG. 4A).

Further, when the charging of the supercapacitor 20 is suitably completed, the conditions of driving the vehicle are preferably provided, and thus the drive motor 41 is operated to complete the start-up (⑤ of FIG. 4A).

FIG. 4A shows voltage states in areas (1), (2), and (3) in the above processes of ① to ⑤ in the power configuration system of FIG. 3A.

According to certain embodiments of the invention as described herein, although the power configuration system of the present invention is suitably different from the conventional power configuration system, there is not a considerable difference in the start-up sequence of the fuel cell 110. In certain embodiments, for example, in the power configuration system of FIG. 3B, the LDC 150 preferably boosts the low voltage power of the auxiliary battery (e.g., 12 V auxiliary battery) 151 to the high voltage and supplies the boosted high voltage (e.g., 320 V) to the high voltage junction boxes 113 and 117. Accordingly, the electric power for starting the fuel cell 110 is suitably supplied to the high voltage components 114 to 116 including the air blower 111 through the high voltage junction boxes 113 and 117, thus enabling the start-up (① of FIG. 4B).

Accordingly, in this state, a hydrogen valve is suitably opened to supply hydrogen to the fuel cell stack, and the control of the air supply is performing by controlling the RPM of the air blower 111 (② of FIG. 4B). In further embodiments, after the fuel cell 110 is started as such, the LDC 150 is converted into a buck mode (12V charging) (③ of FIG. 4B), and the supercapacitor 120 is initially charged with the electrical energy of the fuel cell 110 (④ of FIG. 4B).

In further exemplary embodiments, after the charging of the supercapacitor 120 is completed, the conditions of driving the vehicle are suitably provided, and thus the MCU 140 operates the drive motor 41 to complete the start-up (⑤ of FIG. 4B).

FIG. 4B shows voltage states in areas (1), (2), and (3) in the above processes of ① to ⑤ in the power configuration system of FIG. 3B.

In further embodiments, the present invention describes a regenerative braking mode in the conventional power configuration system and in the power configuration system of the present invention, with reference to FIGS. 5A, 5B, 6A, and 6B below.

Figure 5A:
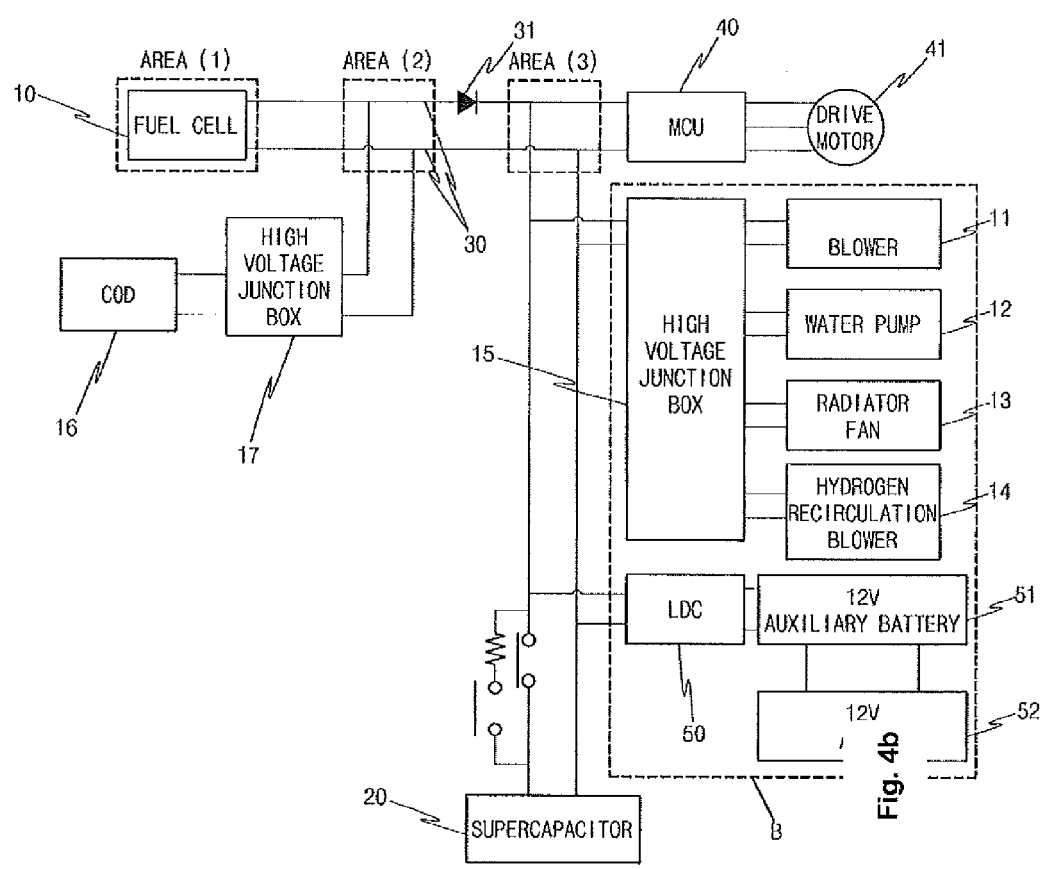
FIG. 5A is a diagram illustrating a regenerative braking mode in the conventional power configuration system.
Figure 5B:
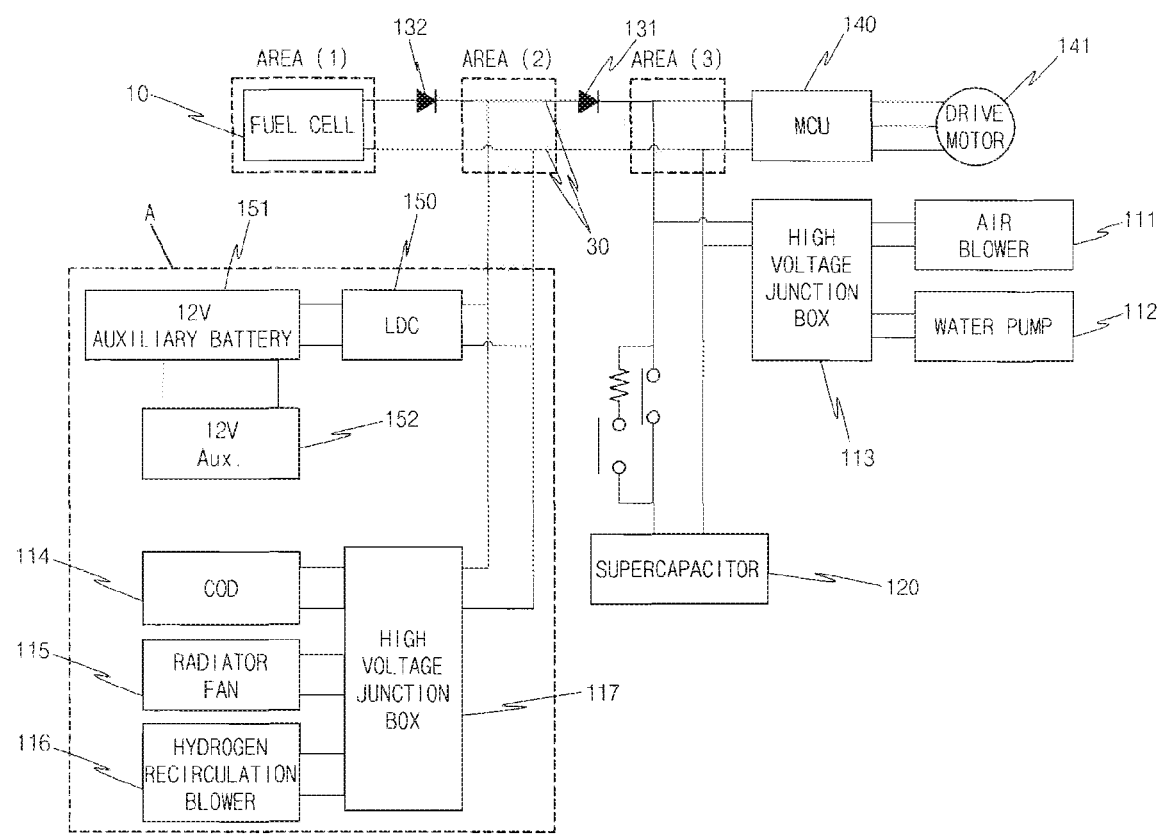
FIG. 5B is a diagram illustrating a regenerative braking mode in the power configuration system of the present invention.
Figure 6A:
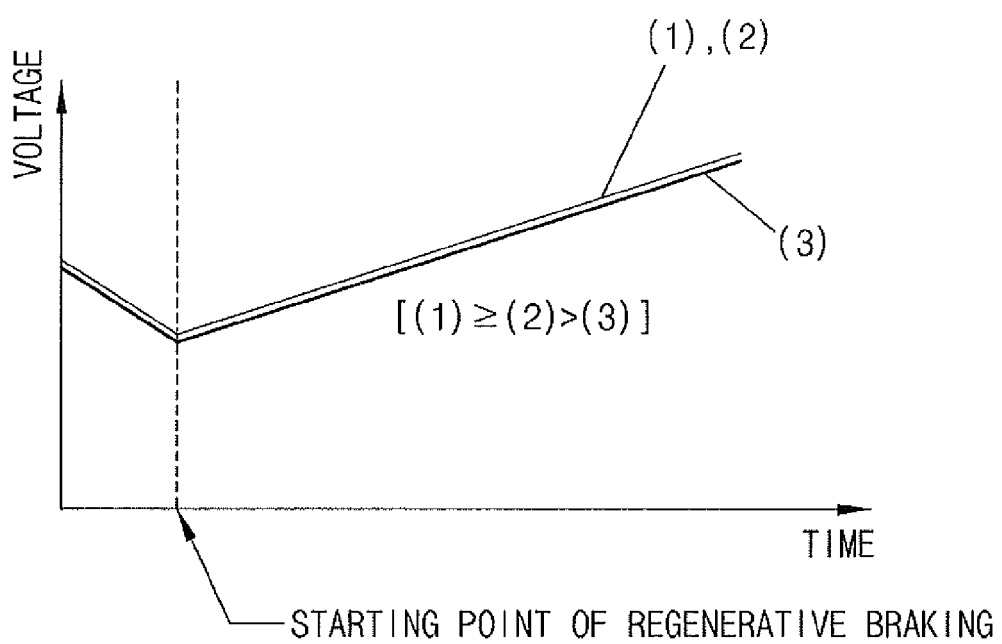
FIG. 6A is a diagram showing changes in voltage during regenerative braking in the conventional power configuration system.
Figure 6B:
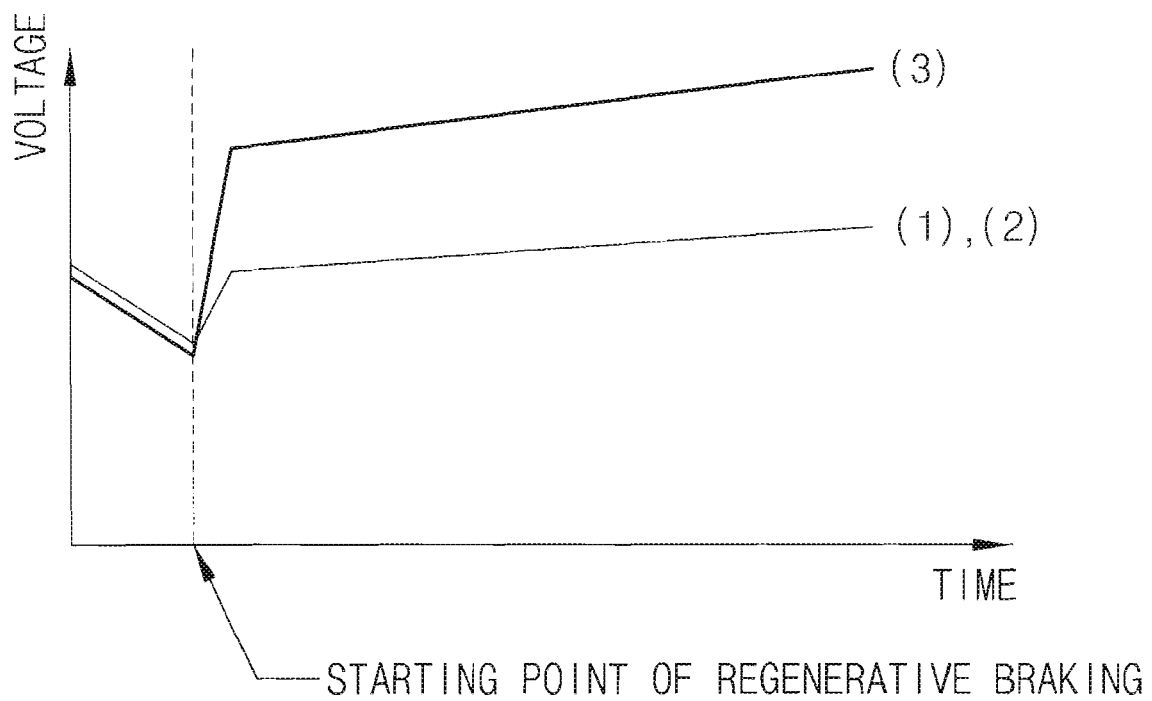
FIG. 6B is a diagram showing changes in voltage during regenerative braking in the power configuration system of the present invention.

FIG. 5A is an exemplary diagram illustrating a regenerative braking mode in the conventional power configuration system, FIG. 5B is an exemplary diagram illustrating a regenerative braking mode in the power configuration system of the present invention, FIG. 6A is an exemplary diagram showing changes in voltage during regenerative braking in the conventional power configuration system, and FIG. 6B is a diagram showing changes in voltage during regenerative braking in the power configuration system of the present invention.

In certain preferred embodiments of the present invention, area (1), area (2), and area (3) are divided with respect to the two blocking diodes 131 and 132, in which the voltage of area (1) suitably corresponds to the voltage of the fuel cell, the voltage of area (2) suitably corresponds to the voltage of the main bus terminal between the two blocking diodes 131 and 132, and the voltage of area (3) suitably corresponds to the voltage of the main bus terminal (supercapacitor) from the rear of the second blocking diode 132 to the MCU 140.

In certain exemplary embodiments, for example as set forth in the power configuration system of FIG. 5A, the regenerative braking energy generated by the operation of a brake is preferably supplied from the drive motor 41 to area (3) through the MCU 40 and, at the same time, the voltage of the fuel cell 10 from which the load is removed is gradually increased to suitably reach an open circuit voltage (OCV). According to further preferred embodiments of the invention, the electrical energy, i.e., the regenerative braking energy, supplied to area (3) through the MCU 40 suitably charges the supercapacitor 20 having the lowest voltage. In further embodiments, simultaneously, the voltage of the fuel cell 10, which is gradually increased to reach the OCV, preferably also charges the supercapacitor 20 through area (3), which, for example, is the drawback of the conventional power configuration system. For example, it is unnecessary to use hydrogen as fuel since it is under braking; nevertheless, the hydrogen is unnecessarily consumed in the fuel cell 10 to charge the supercapacitor 20. Accordingly, since the fuel cell 10 is suitably charging the supercapacitor 20, the supercapacitor 20 is more rapidly charged, and thus the regenerative braking energy supplied through the MCU 40 may not suitably charge the supercapacitor 20.

Preferably, during regenerative braking, only when the voltages of areas (1) and (2) are lower than that of area (3), a maximum amount of regenerative braking energy applied from the drive motor 41 may be suitably charged in the supercapacitor 20, and it is possible to prevent the unnecessary waste of hydrogen due to the unnecessary charging operation of the fuel cell 10. However, in the conventional power configuration system, it is not possible to stop the fuel cell 10 from unnecessary charging the supercapacitor 20 during regenerative braking.

For example, in certain exemplary embodiments and referring to FIG. 6A, while the voltages of areas (1), (2), (3) are little different from each other, the voltages are maintained in the order of area (1)≧area (2)>area (3).

However, in the power configuration system of the present invention, when entering the regenerative braking mode, the regenerative braking energy is suitably supplied from the drive motor 141 to area (3) through the MCU 140. Accordingly, all the electrical energy generated during regenerative braking is transmitted to the supercapacitor 120 by the two diodes 131 and 132 positioned between areas (1) to (3) other than a portion supplied to the air blower 111 through the high voltage junction box 113.

In the conventional system, since the load of the drive motor 41 is removed, the voltage of the fuel cell 10 is suitably increased, and thus the electrical energy of the fuel cell 10 is transmitted to the supercapacitor 20 due to the increase in voltage. However, in the power configuration system of the present invention, when the operations of the high voltage components 114 to 116 are preferably appropriately controlled by changing the positions of the high voltage components 114 to 116 including the LDC 150 to the positions between the two diodes 131 and 132 in the main bus terminal 130, it is possible to reduce the voltage of area (2) to be lower than that of area (3), and thus it is possible to prevent the fuel cell 110 from unnecessarily charging the supercapacitor 120. Since the high voltage components in area A are preferably operated to drive the vehicle, it is not meant that the electric power of the fuel cell 110 is unnecessarily consumed even through the high voltage components in area A are operated in order to maintain the voltage of area (2) below that of area (3).

Accordingly, in the power configuration system of the present invention, when the high voltage components in area A are appropriately operated during regenerative braking, it is possible to maintain the voltage of area (1), i.e., the voltage of the fuel cell 110, below a suitable predetermined voltage (e.g., 0.85 V) even during the regenerative braking, and thus the durability of the fuel cell 110 is suitably improved. It is well known in the art that when the voltage per cell rises above a predetermined level, it does not have a favorable effect on the durability of the fuel cell.

Accordingly, in the power configuration system of the present invention, it is possible to maintain the voltage of area (2) below that of area (3) during regenerative braking, and thus it is possible to suitably prevent the voltage of the fuel cell 110 from unnecessarily charging the supercapacitor 120. As a result, a sufficient amount of regenerative braking energy can be charged in the supercapacitor 120, which results in an improvement in fuel efficiency.

Referring to FIG. 6B, the voltage of area (1) is substantially the same as that of area (2); however, during regenerative braking, the voltage of area (3) shows a significant difference from the voltages of areas (1) and (2). Thus, the fuel cell 110 cannot charge the supercapacitor 120 during regenerative braking due to such voltage states.

Next, an idle stop mode in the conventional power configuration system and that in the power configuration system of the present invention will be described with reference to FIGS. 7A, 7B, 8A, and 8B below.

Figure 7A:
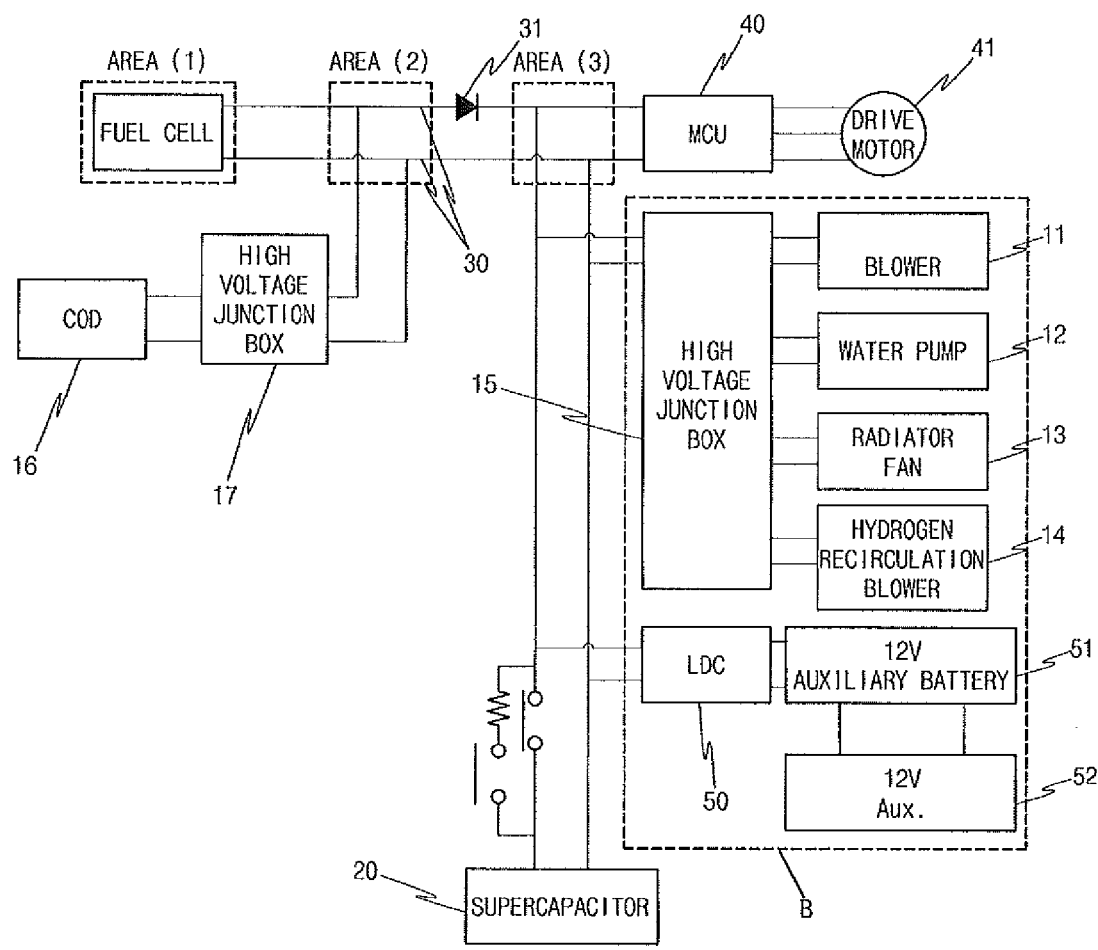
FIG. 7A is a diagram illustrating an idle stop mode in the conventional power configuration system.
Figure 7B:
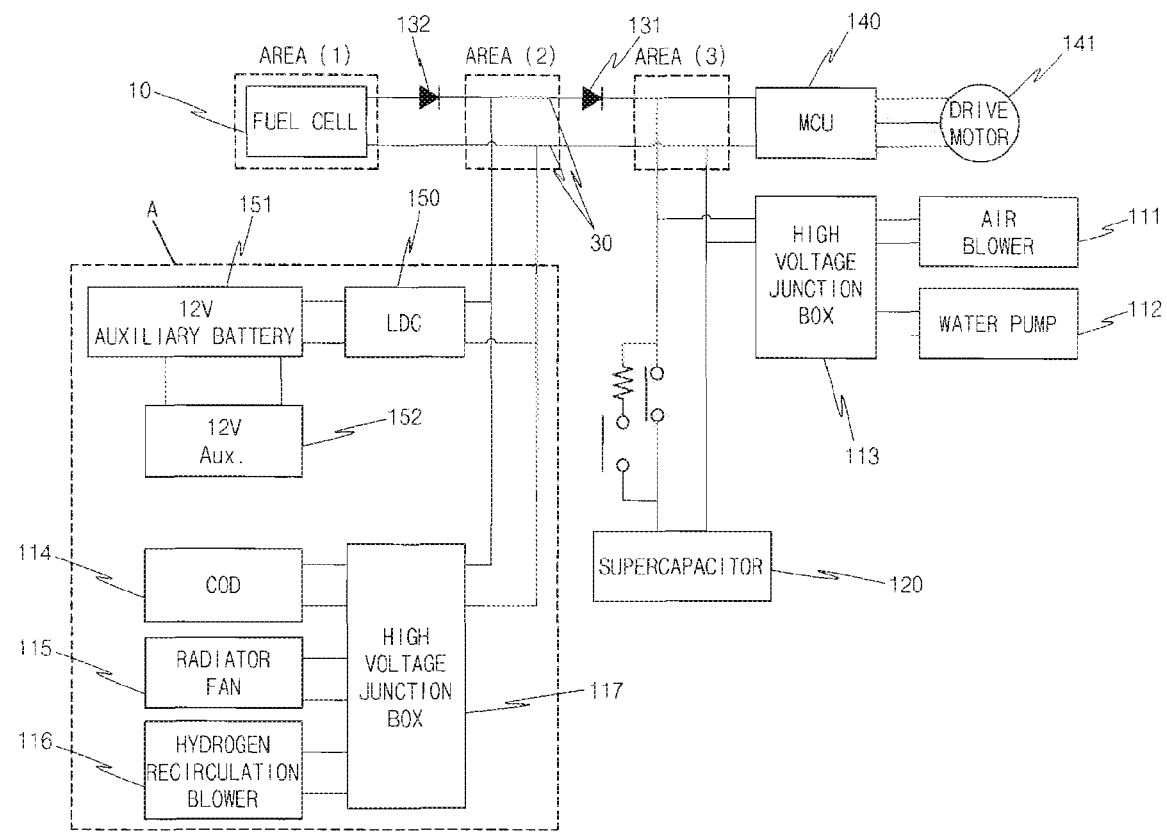
FIG. 7B is a diagram illustrating an idle stop mode in the power configuration system of the present invention.
Figure 8A:
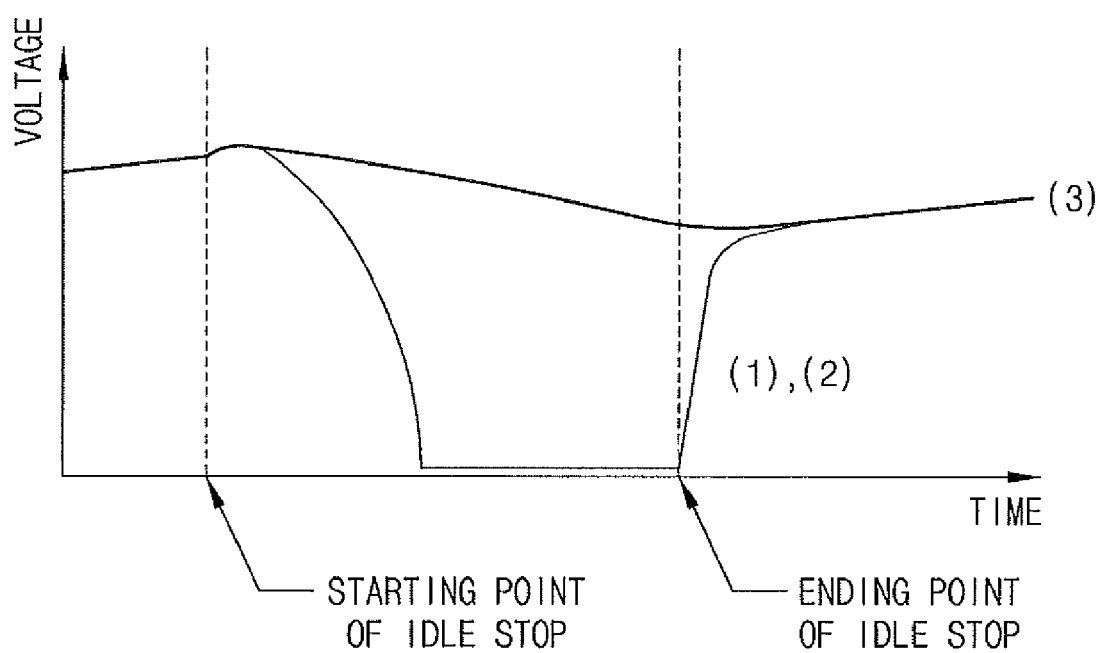
FIG. 8A is a diagram showing changes in voltage during idle stop in the conventional power configuration system.
Figure 8B:
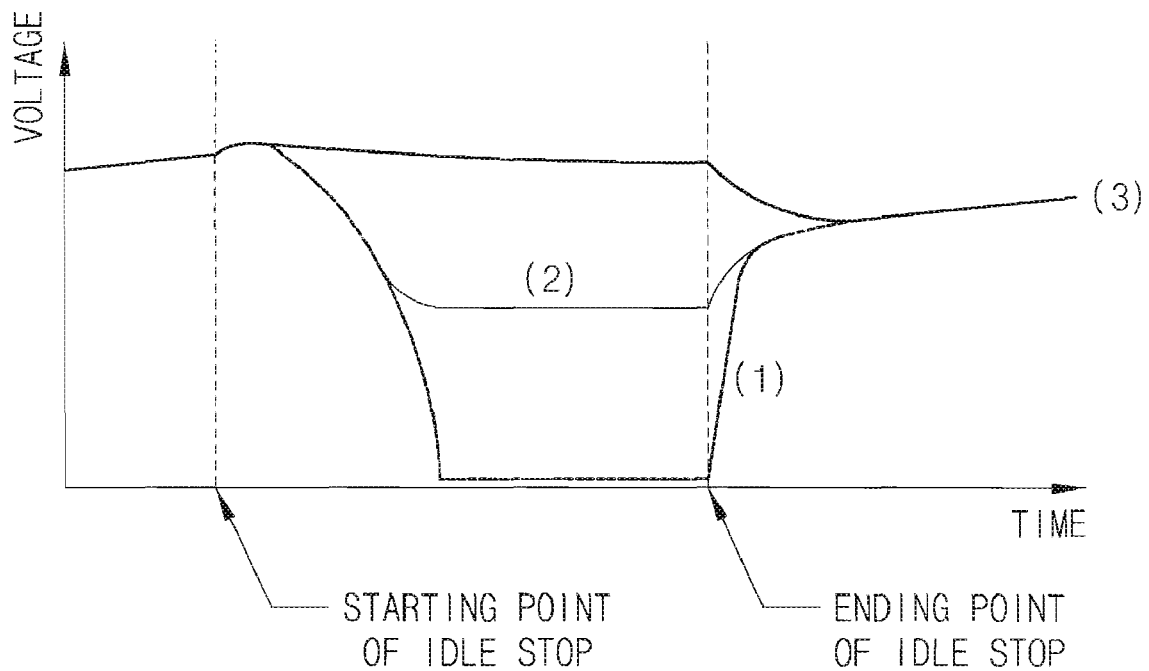
FIG. 8B is a diagram showing changes in voltage during idle stop in the power configuration system of the present invention.

FIG. 7A is a diagram illustrating an idle stop mode in the conventional power configuration system, FIG. 7B is a diagram illustrating an idle stop mode in the power configuration system of the present invention, FIG. 8A is a diagram showing changes in voltage during idle stop in the conventional power configuration system, and FIG. 8B is a diagram showing changes in voltage during idle stop in the power configuration system of the present invention.

In the case where the fuel cell hybrid vehicle is stopped at an intersection, if the balance of plant (BOP) components of the fuel cell are driven not by the electrical energy generated by driving the fuel cell but by the electrical energy stored in the supercapacitor by stopping the operations of the high power consuming components, the fuel efficiency can be improved. As such, the stopping of the fuel cell power generation is called an idle stop.

The operation of the fuel cell 10 is stopped under the idle stop condition, which is available when the operation of the air blower 11 is stopped. Moreover, since the operation of the fuel cell 10 is stopped, it is possible to stop the operations of the high voltage components for driving the fuel cell 10 such as the water pump 12, the radiator fan 13, and the hydrogen recirculation blower 14.

Referring to FIG. 8A, when entering the idle stop mode, the operations of the components such as the air blower 11, the water pump 12, the radiator fan 13, and the hydrogen recirculation blower 14 are stopped, and thus the voltages of areas (1), (2), and (3) are instantaneously increased. However, the voltages of areas (1) and (2) are gradually decreased when the operation of the air blower 11 is stopped. Thus, the components in area A are driven by the voltage of area (3), i.e., the electrical energy stored in the supercapacitor 20.

Then, when a predetermined time elapses or when a driver presses an accelerator pedal, the idle stop mode is terminated, and the fuel cell system controller drives the components such as the air blower 11, the water pump 12, the radiator fan 13, and the hydrogen recirculation blower 14 to restart the power generation of the fuel cell 10. When the power generation of the fuel cell 10 is restarted, the voltages of areas (1) and (2) are increased to reach the voltage of the supercapacitor 20, thus entering a hybrid mode.

On the contrary, in the power configuration system of the present invention, when the fuel cell hybrid vehicle enters the idle stop mode, the operations of the high power consuming components such as the air blower 111 and the water pump 112 are stopped. Then, the voltage of area (1), i.e., the voltage of the fuel cell 110, is gradually reduced and, at this time, the voltage of area (2) is controlled by the LDC 150. That is, the voltage of the auxiliary battery (e.g., 12 V auxiliary battery) is boosted by the LDC 150 to maintain the voltage of area (2) below the voltage of area (3), i.e., the voltage of supercapacitor 120. In this case, there is an advantage in that the cooling and hydrogen recirculation can be performed at any time by driving the radiator fan 115 and the hydrogen recirculation blower 116 even in the case where the power generation of the fuel cell 110 is stopped.

When entering the idle stop mode, the operations of the air blower 111, the water pump 112, the radiator fan 115, and the hydrogen recirculation blower 116 are stopped, and thus the voltage of the fuel cell 110 is instantaneously increased to reach the OCV. At this time, as shown in FIG. 8B, the voltages of areas (1), (2), and (3) are increased. However, the voltage of area (1) is gradually decreased when the operation of the air blower 111 is stopped, and the voltage of area (2) is decreased to a predetermined level by the boosting operation of the LDC 150 (by boosting 12 V auxiliary battery energy).

Then, when a predetermined time elapses or when the driver presses the accelerator pedal, the idle stop mode is terminated, and the fuel cell system controller drives the components such as the air blower 111, the water pump 112, the radiator fan 115, and the hydrogen recirculation blower 116 to restart the power generation of the fuel cell 110. When the power generation of the fuel cell 110 is restarted, the voltage of areas (1) is increased again, and the voltage of area (2) charges the auxiliary battery 151 by the buck mode operation of the LDC 150 (the 12 V auxiliary battery is charged with the voltage of area (2), thus entering the hybrid mode.

The control method in the idle stop mode in accordance with the present invention has an advantage in that the electric power of the supercapacitor 120 is hardly used during the idle stop, compared with the conventional method. The necessary electric power is supplied from the auxiliary battery 151, and the electric power stored in the supercapacitor 120 is supplied to the MCU 140 to propel the vehicle when the driver intends to accelerate the vehicle or used to drive the air blower 111 to restart the operation of the fuel cell 110. As such, according to the present invention, it is possible to drive the fuel cell hybrid vehicle over a long distance without a restart of the fuel cell compared with the conventional method, thus improving fuel efficiency.

As described above, according to preferred embodiments of the present invention that describe the power configuration system of a fuel cell vehicle and a method for controlling the same, the second blocking diode 132 is preferably installed in the main bus terminal 130 at the output terminal of the fuel cell 110 (in front of the first blocking diode 131), preferably separately from the existing first blocking diode installed in the main bus terminal 130, where in certain preferred embodiments, the positions of the high voltage components for driving the fuel cell 110 are suitably changed from the rear of the first blocking diode 131 to the front of the first blocking diode 131, and the operations of the high voltage components 114 to 116 are preferably appropriately controlled during regenerative braking such that the voltage of the fuel cell 110 is suitably maintained below that of the supercapacitor 120. Thus, according to the present invention, it is possible to prevent the fuel cell 110 from unnecessarily charging the supercapacitor 120, thereby suitably increasing the amount of regenerative braking energy and improving fuel efficiency.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A power configuration system of a fuel cell hybrid vehicle equipped with a fuel cell as a main power source and storage means as an auxiliary power source, wherein high voltage components for driving the fuel cell are arranged in front of a first blocking diode installed in a main bus terminal such that the voltage of the fuel cell is maintained below the voltage of the storage means by consuming electric power of the fuel cell when the high voltage components are driven during regenerative braking, wherein a second blocking diode is added to the main bus terminal at an output terminal of the fuel cell.

2. The system of claim 1, wherein the high voltage components comprise an LDC to which an auxiliary battery is connected, a radiator fan, and a hydrogen recirculation blower.

3. The system of claim 2, wherein the high voltage components further comprise an air supply device for supplying air to the fuel cell.

4. The system of claim 2, wherein the high voltage components further comprise a water pump for circulating coolant of the fuel cell.

5. A motor vehicle comprising the power configuration system of a fuel cell hybrid vehicle equipped with a fuel cell as a main power source and a storage means as an auxiliary power source of claim 1.

6. The system of claim 1, wherein the high voltage components comprise an LDC to which an auxiliary battery is connected, a radiator fan, and a hydrogen recirculation blower.

7. The system of claim 1, wherein the high voltage components are arranged between the second blocking diode and the first blocking diode.

8. A method for controlling a power configuration system of a fuel cell hybrid vehicle equipped with a fuel cell as a main power source and storage means as an auxiliary power source, the method comprising:
   allowing the fuel cell hybrid vehicle, in which high voltage components including an LDC for driving the fuel cell are arranged between a first blocking diode and a second blocking diode installed in a main bus terminal, to enter a regenerative braking mode; and
   allowing a fuel cell system controller to drive the high voltage components to consume electric power of the fuel cell when entering the regenerative braking mode such that the voltage of the fuel cell is maintained below that of the storage means.

9. The method of claim 8, further comprising:
   allowing the fuel cell hybrid vehicle to enter an idle stop mode;
   allowing the fuel cell system controller to stop the operation of an air supply device and allowing the LDC to boost the voltage supplied from an auxiliary battery and to supply the boosted voltage to the main bus terminal, the boosted voltage of the main bus terminal being maintained below that of the storage means; and
   allowing the fuel cell system controller to drive the high voltage components including the air supply device for driving the fuel cell by the boosted voltage and the voltage of the storage means so as to restart power generation of the fuel cell.

10. A power configuration system of a fuel cell hybrid vehicle equipped with a fuel cell as a main power source and a storage means as an auxiliary power source, wherein one or more high voltage components for driving the fuel cell are arranged in front of a first blocking diode installed in a main bus terminal, wherein a second blocking diode is added to the main bus terminal at an output terminal of the fuel cell.

11. The power configuration system of a fuel cell hybrid vehicle of claim 10, wherein the voltage of the fuel cell is maintained below that of the storage means by consuming electric power of the fuel cell when the one or more high voltage components are driven during regenerative braking.

12. The system of claim 10, wherein high voltage components for driving the fuel cell are arranged between the second blocking diode and the first blocking diode.

13. The system of claim 10, wherein the high voltage components are selected from the group consisting of; an LDC to which an auxiliary battery is connected, a radiator fan, a hydrogen recirculation blower, an air supply device for supplying air to the fuel cell, and a water pump for circulating coolant of the fuel cell.

14. A motor vehicle comprising the power configuration system of a fuel cell hybrid vehicle equipped with a fuel cell as a main power source and a storage means as an auxiliary power source of claim 10.

15. A method for controlling a power configuration system of a fuel cell hybrid vehicle equipped with a fuel cell as a main power source and storage means as an auxiliary power source, the method comprising:

allowing the fuel cell hybrid vehicle, wherein one or more high voltage components for driving the fuel cell are arranged between a first blocking diode and a second blocking diode installed in a main bus terminal, to enter a regenerative braking mode; and allowing a fuel cell system controller to drive the high voltage components to consume electric power of the fuel cell when entering the regenerative braking mode.

16. The method of claim 15, wherein the high voltage components are selected from the group consisting of: an LDC to which an auxiliary battery is connected, a radiator fan, and a hydrogen recirculation blower.

17. The method of claim 15, where the voltage of the fuel cell is maintained below that of the storage means.

18. The method of claim 15, further comprising:
allowing the fuel cell hybrid vehicle to enter an idle stop mode.

19. The method of claim 15, further comprising:
allowing the fuel cell system controller to stop the operation of an air supply device and allowing an LDC to boost the voltage supplied from an auxiliary battery and to supply the boosted voltage to the main bus terminal, the boosted voltage of the main bus terminal being maintained below that of the storage means.

20. The method of claim 15, further comprising:
allowing the fuel cell system controller to drive the high voltage components including the air supply device for driving the fuel cell by the boosted voltage and the voltage of the storage means so as to restart power generation of the fuel cell.

* * * * *